April 26, 1966 M. D. SANNER 3,248,524

DOCUMENT SKEW DETECTION

Filed June 4, 1962 2 Sheets-Sheet 1

April 26, 1966 M. D. SANNER 3,248,524

DOCUMENT SKEW DETECTION

Filed June 4, 1962 2 Sheets-Sheet 2

United States Patent Office 3,248,524

Patented Apr. 26, 1966

3,248,524

DOCUMENT SKEW DETECTION

Medford D. Sanner, Irving, Tex., assignor to Sperry Rand Corporation, New York, N.Y., a corporation of Delaware Filed June 4, 1962, Ser. No. 199,996

11 Claims. (Cl. 235—61.11)

This invention relates to the operation of systems in which documents are successively passed through a reading station and more particularly to a system and method for sensing the attitude of the document at such station.

In automatic data processing systems wherein documents are successively and sequentially moved through a reading station located along a document way, it has been found that a reader may be subject to faulty operation if the document is presented skewed either with the leading edge up or with the trailing or tail edge up. Documents ordinarily are driven along a document way in which suitable propelling mechanisms are provided. Documents such as punched cards, invoices or banking drafts encoded in magnetic ink may be processed at the rate of 20 per second or more. It is essential that each document be presented to the reader properly aligned. If the document is skewed as it reaches the reading station, the document may be rejected even though the document itself is without fault. Thus, it becomes desirable to determine the occurrence and the nature of each improper presentation of a document and to take necessary remedial steps to eliminate the cause.

The present invention relates to sensing the document attitude as it passes a reading station. More particularly, there is provided a system for determining the attitude of a document traveling in a document way. Sensing means is provided for generating a function which varies in accordance with the variations in the position of one of the longitudinal edges of the document relative to a fixed point along the document way. An analyzing circuit is connected to the sensing means for generating an output indication. Means are then provided for controlling the threshold below which the analyzing circuit is non-responsive to a signal from the sensing means.

In a more specific aspect, there is provided a means for generating a signal which varies in accordance with the position of the bottom edge of a document relative to the bottom of a document way as it passes the sensing station. Skewed tail-up, a progressively increasing voltage will be generated. Skewed nose-up, a progressively decreasing voltage will be generated as the document passes the sensing station. In either case, a signal will vary in one sense for a first condition of skew and in the opposite sense for a second condition of skew. A signal is then applied to each of a pair of sensing channels. A comparison means is provided in each channel for comparing the magnitude of the signal as between two reference points on the time-varying signal produced by passage of the document by the sensing station. Polarity sensitive means in each of the channels provides for an output indication at the output of each channel representative of the passage of a document of given skew or attitude.

In a preferred embodiment of the invention, indicating means is provided selectively operable in response to output indications representing skew of either or both tail-up or nose-up attitude in excess of a pre-set level.

For a more complete understanding of the present invention and for further objects and advantages thereof, reference may now be had to the following description taken in conjunction with the accompanying drawings in which.

Figures 1, 4, 5:
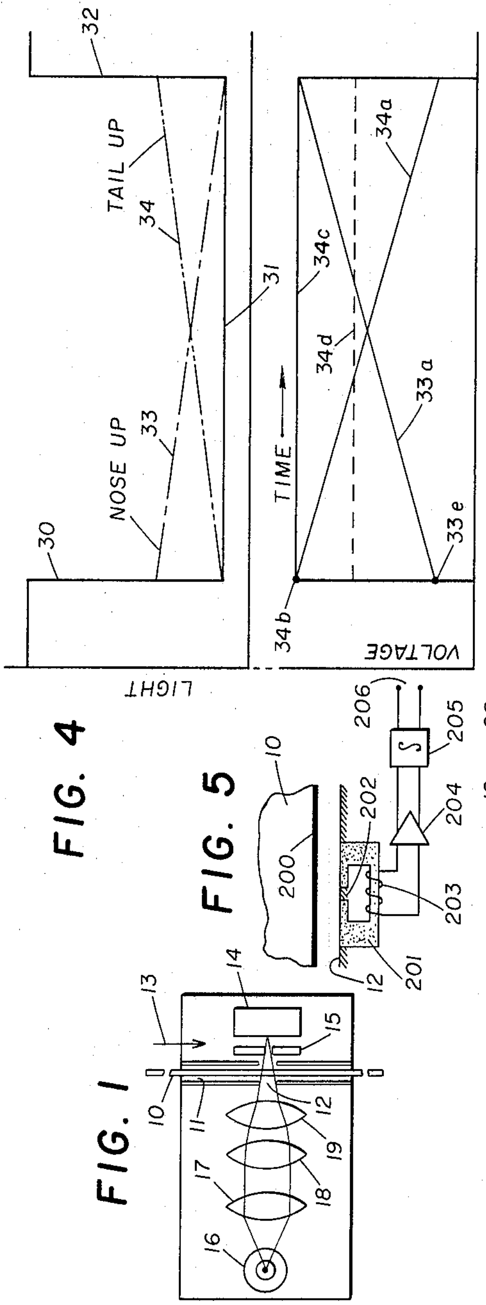
FIGURE 1 is a top view of a document sensing station.
FIGURE 4 is a graph of time variable pulses generated and utilized in the system.
FIGURE 5 is a modification of the invention.

Referring now to FIGURE 1, there is illustrated a document 10 positioned in a document way 11. The document is propelled past a slot 12 in the document way and then passes in the direction of arrow 13 to points beyond the sensing station. A photo-cell 14 is provided with a slotted baffle 15 such that light is permitted to reach the photo-cell 14 through a slot which is perpendicular to the direction of travel of the document 10. On the side of the document 10 opposite the photo-set cell 14 there is provided a light source such as a lamp 16. The light passes through a collimating lens 17 which directs the light in parallel rays. The light passes through cylindrical lenses 18 and 19. By this means light is directed as a narrow beam into the slot in the baffle 15. Thus, as the document 10 passes the slot 12, it interrupts the light reaching the photo-cell 14. In the side view of the device included in FIGURE 2, the document 10 is positioned to travel along the document way formed by the walls 11*a* and 11*b*. The lamp 16 is positioned adjacent to the lens system 17, 18, and 19. Light passes through a slot in the baffle 15 to the photo-cell 14. When the bottom edge of the document 10 is positioned above the level of the floor or bottom 20 of the document way 11, light passes through the slot in baffle 15 to the photo-cell 14.

FIGURE 4 illustrates a plot of the voltage output from the photo-cell 14 for various attitudes of the document passing the slot 12. If the document is perfectly aligned with the document way, the light will be abruptly stopped as the document passes the slot 12 as indicated by the step 30. The output of the photo-cell will then be constant as indicated by the horizontal section 31. Following passage of the tail of the document, the light will abruptly illuminate the photo-cell with full intensity as indicated by the step 32. The high level of illumination will exist until the next document passes the slot 12. If the nose of the document is elevated, a fraction of the light beam will continue to pass through the slot to energize the photo-cell 14 but with decreasing intensity until the trailing edge of the document passes the slot. The light decreases linearly as indicated by the line 33. As the trailing edge passes the slot, the light intensity may be of the same level as if the document were perfectly aligned in the slot. In the same general manner, if the tail of the document is elevated, the light beam will be immediately substantially stopped. The gradual increase in the height of the document edge results in the increasing function 34 representing the output of the photo-cell 14.

In accordance with the present invention, a two channel comparison is made between (a) the voltage output of the photo-cell as the leading edge passes the slot 12, and (b) the output of the photo-cell at a fixed time later. If the delay sample is higher or lower than the initial sample by an amount in excess of a predetermined threshold, then an alarm or indication is provided to signal passage of a document through the document way having a skew in excess of a predetermined amount. It will be noted from FIGURE 4 that a properly aligned document may not completely block the light beam from the photo-cell. The system operates on the basis of differences in the photo-cell output rather than upon the absolute magnitudes thereof.

Figure 2:
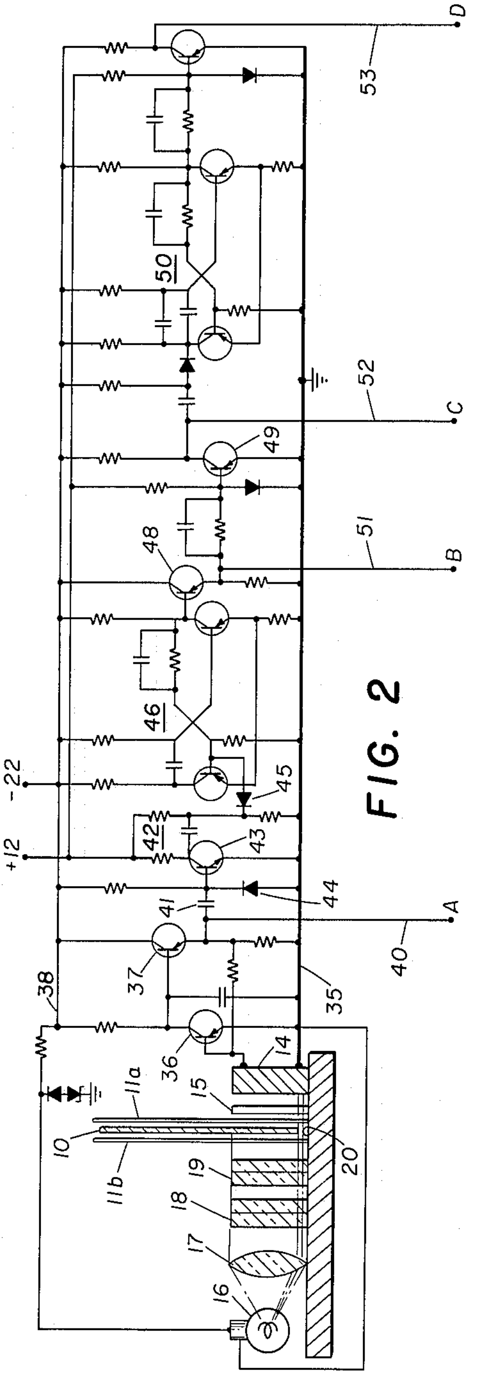
FIGURE 2 is a schematic diagram of a portion of the system and includes an end view of the document sensing station.
Figure 3:
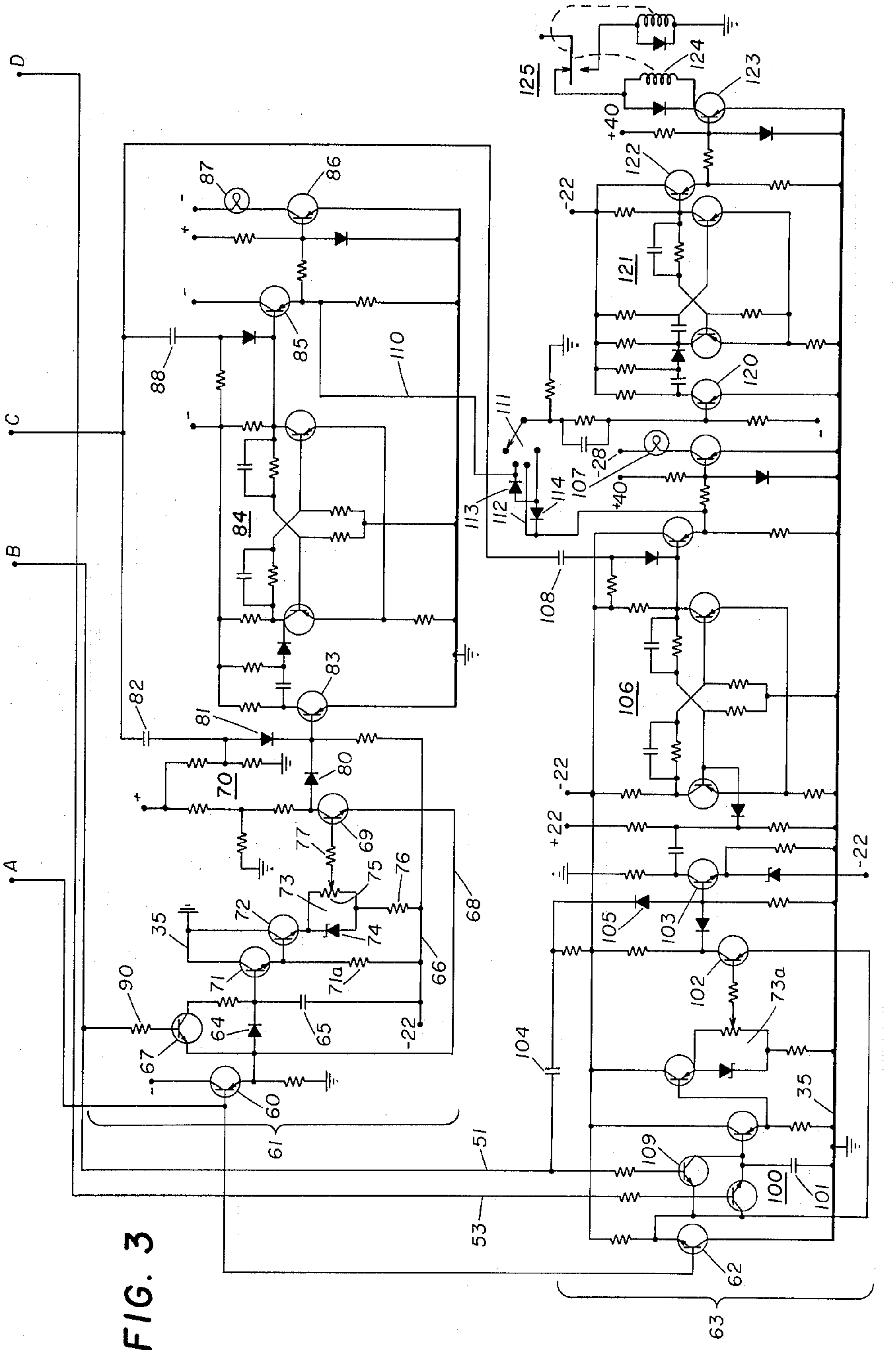
FIGURE 3 is a schematic diagram of the balance of the system.

FIGURES 2 and 3 illustrate a complete system for utilizing the voltages from the photo-cell 14.

One terminal of the photo-cell 14 is connected to a ground reference bus 35. The other terminal of the photo-cell 14 is connected to the base of a transistor 36 which is the input to an inverting amplifier unit comprised of the transistor 36 and the follower transistor 37. The amplifier 36, 37 is supplied from a supply bus 38. In this case the bus 38 is connected to the minus 22 volt terminal relative to the ground bus 35. The waveform of FIGURE 4, generated by passage of a given document, appears at the emitter terminal of transistor 37 amplified and in inverted form. The latter signal is transmitted by way of conductor 40 to two sensing channels included in FIGURE 3. The output signal is also differentiated as it passes through condensor 41 to produce a voltage pulse at the output of the pulse amplifier circuit 42. The pulse produced in the differentiating-amplifying circuit 41, 42 coincides with the leading edge of the voltage pulse from transistor 37. The transistor 43 in the amplifier 42 is an N-P-N device with the collector terminals supplied from a +12 volt source and the emitter terminal connected to the ground reference bus 35. A diode 44 back biases the base of the transistor 43.

The output pulse from circuit 42 coincident with the leading edge of the signal from the photo-cell 14 is applied by way of diode 45 to the input of a monostable multivibrator 46. The multivibrator 46 has a preset on-time which, in the present example, is 16.6 milliseconds which correspond with 5 inches of travel of a document passing through the document way 11. While other timing intervals and other document speeds may be employed, this example corresponds with documents handling at the rate of 20 per second and will be employed in the following explanation.

The output of the multivibrator 46 is transmitted by way of an emitter follower stage including the transistor 48 and, then, by way of an inverter including transistor 49, to the input to a second monostable multivibrator 50. The output of transistor 48 is also transmitted to the two channels of FIGURE 3 by way of the conductor 51. The output of the inverter 49 is transmitted to the two channels of FIGURE 3 by way of conductor 52. The output of the monostable multivibrator 50 is transmitted to only one of the two channels of FIGURE 3 by way of conductor 53.

The multivibrator 50 has an on-time which is pre-set and is substantially smaller than the on-time of the multivibrator 46. In the example given, the on-time for multivibrator 46 is 16.6 milliseconds corresponding with 5 inches of travel for a document whereas the on-time of multivibrator 50 is one millisecond corresponding with about one-third of an inch of travel.

Since the ouput of the amplifier 36, 37 is inverted from the voltage as it appears at the output of the photo-cell 14, it will be convenient for the following description to refer to the inverted waveforms shown in FIGURE 4, and, specifically, to waveform 33*a* which corresponds with the variation in voltage output for a nose-up condition and to the waveform 34*a* which corresponds with the variation in output voltage for a tail-up condition.

Referring now to FIGURE 3, it will be noted that the conductor 40 on which the output waveforms appear is connected to the input of an emitter-follower amplifier 60 in the first channel 61 as well as to the input to a second emitter-follower amplifier 62 of the second channel 63. The first channel 61 will provide an output response when the document passes the slot 12 tail-up. The second channel will provide an output if the document passes the slot 12 with nose-up.

In the tail-up channel 61, the emitter of transistor 60 is connected by way of a diode 64 to a condenser 65, the second terminal of which is connected to a −22 volt reference bus 66. A connection is also provided to the emitter of a gate transistor 67 and, by way of conductor 68, to the emitter of a transistor 69 which is employed as a switch at the input of an and-gate 70. The juncture between capacitor 65 and the diode 64 is connected to the base of a transistor 71. The emitter of transistor 71 is connected to the base of a transistor 72 and, by way of resistance 71*a*, to the bus 66. The emitter of transistor 72 is connected to a reference voltage circuit 73, comprised of a Zener diode 74 and a potentiometer 75 connected in parallel. The parallel circuit is connected by way of resistance 76 to the bus 66. The variable tap on potentiometer 75 is connected by way of resistance 77 to the base of the transistor 69. The collectors of transistors 71 and 72 are connected to the ground reference bus 35.

In operation of the circuit thus far described in channel 61, the condenser 65 is charged to the peak voltage 34*b* of the waveform 34*a*. Since the voltage 34*a* decreases from the peak 34*b*, the condenser 65 will stay charged to the peak level so long as transistor 67 is nonconductive. The voltage on the tap of the potentiometer 75 is maintained at a reference level which is a predetermined fraction of the voltage across condenser 65. The voltage on condenser 65 may be considered to be represented by a solid line 34*c*. The voltage on the tap of potentiometer 75 may be considered to be some preselected fraction of that such as represented by the dotted line 34*d*. It will be noted that the conductor 68 is connected between the emitter of transistor 60 and the emitter of transistor 69. The voltage represented by the curve 34*a* will cause the emitter of transistor 69 progressively to become more negative. At the point that the voltage on the emitter of transistor 69 becomes more negative than the reference voltage established on the base of transistor 69, the transistor 69 becomes conductive. It will remain conductive until the circuit is reset. The initiation of conduction in transistor 69 signals passage of a document with tail-up skew in excess of the level set by the potentiometer 75.

The output of transistor 69 is connected by way of diode 80 to the and-gate 70. The second input to the and-gate is provided from the output of transistor 49 as applied to the circuit of FIGURE 3 by way of conductor 52 and diode 81. The capacitor 82 serves to differentiate the trailing edge of a square waveform appearing on conductor 52 so that diode 81 is momentarily rendered conductive. If diode 80 at that time is conductive by reason of conduction through transistor 69, then the amplifier transistor 83 will be turned on thereby to create a pulse which will turn on the bistable multivibrator 84. When bistable multivibrator 84 is turned on, an output signal is applied by way of transistors 85 and 86 to energize a signal lamp 87. The signal lamp 87, when on, indicates that a document has passed the slot 12 with a tail-up attitude.

Light 87 will remain energized until the bistable multivibrator 84 is returned to its initial state by application of a control pulse thereto from conductor 52 and by way of condenser 88. The latter control pulse is generated upon the presentation at the slot 12 of the next succeeding document. Thus, channel 61 is reset in order to signal the condition of the next document.

It will be remembered that the output from the monostable multivibrator 46 is a square waveform which appears on the conductor 51. The conductor 51 is connected by way of resistance 90 to the base of the gate 67. Gate 67 is normally conductive to maintain the condenser 65 uncharged. When the square wave voltage generated by unit 46 appears on conductor 51, the gate 67 is rendered non-conductive so that a charge will be retained on condenser 65 for the duration of the square wave voltage on conductor 51. By this means it will be assured that the comparison operation of the initial voltage 34*b* and any variation thereafter may be accomplished. After the comparison operation is completed and the square wave voltage on conductor 51 is terminated, the gate 67 again becomes conductive to discharge condenser 65.

There will be considered now the operation of the nose-up channel 63. It will be remembered that the voltage appearing on conductor 40 is applied to both channels 61 and 63. Of course, when a nose-up voltage represented by the curve 33*a* is applied to the tail-up channel, the voltage on condenser 65 continues to increase so that conduction will never be initiated in transistor 69. However, in channel 63 the signal voltage is applied to the emitter follower 62 which is connected at its collector to the ground reference bus 35 and at its emitter to a gate 100. A condenser 101 is connected between the emitter of gate 100 and the ground reference bus 35. The gate 100 is normally non-conductive and is rendered conductive for a one millisecond interval coinciding in time with the leading edge of the waveforms of FIGURE 4. The voltage on condenser 101 is thus representative of the magnitude of the photo-cell output at coincidence with the leading edge of the document. It is then compared with a fraction thereof as sensed in the network 73*a*. Since the voltage references are reversed from those in channel 101, the signal voltage may be applied to the emitter of the amplifier 102, whereas the reference voltage is applied to the base thereof. Since this is a P-N-P device, the emitter becoming more positive than the base causes the transistor 102 to conduct. The comparison circuit 73*a* is connected by way of transistor 102 to an and-gate 103. If the output at the emitter of transistor 62 increases by a predetermined amount relative to bus 35 above the initial level 33*e*, then, when the signal pulse is applied by way of condenser 104 and diode 105 to the and-gate 103, a signal will be applied to the bistable multivibrator 106. Multivibrator 106 then serves to actuate a signal lamp 107 to provide an indication when a document has passed through the document way in a nose-up attitude. The bistable multivibrator is returned to its initial state by a reset pulse applied by way of condenser 108 and condenser 101 is discharged by rendering the gate 109 conductive.

It will be noted that in the channel 61 the voltages are all sensed with reference to a minus 22 reference level. In the channel 63, the voltages are sensed with reference to the ground reference level or the ground reference bus 35. In each case, a condition will be sensed wherein an initial voltage is established which is high relative to the reference level and then thereafter, if a decreasing voltage is encountered, an and-gate will be energized on one input thereof.

By means of the foregoing systems, the signal lamps 87 and 107 will be actuated each time a document proceeds through the document way tail-up or nose-up, respectively.

FIGURE 3 includes a circuit which provides for utilization of the skew signals other than for the mere energization of the lamps 87 and 107.

More particularly, the emitter of transistor 85 is connected by way of conductor 110 to the second terminal of a single pole, four-position switch 111. Conductor 112 applies an output signal from channel 63 to the third terminal of the switch 111. Both conductors 110 and 112 are connected to the fourth terminal of switch 111 by way of the diodes 113 and 114, respectively.

In the first position, the utilization system is switched off and is not used. In the second position, the utilization system is responsive only to tail-up excursions. In the third position, the utilization system is responsive only to nose-up excursions. In the fourth position, the utilization system is responsive to both types of excursions. The signals appearing on the selector arm of switch 111 are applied by way of transistor 120 to a monostable multivibrator 121. The output thereof is applied by way of transistors 122 and 123 to the actuating coil 124 of a relay 125. The relay 125 is embodied in the suitable counter mechanism. It may be employed to reject or divert to a specified collection point those documents passing through the document way 11 which are subject to inaccurate reading by reason of a skew attitude. Other control functions may be accomplished in response to the output of the utilization circuit as the necessity requires. In any event utilization functions other than mere signaling are employed through the utilization circuit itself.

In FIGURE 5 there is illustrated a modified system in which the method of the present invention may be carried out. In this embodiment, the document 10 is provided with a deposit of a magnetic medium, such as magnetic ink, as a trace 200 along the lower edge. At the bottom of the document way 12 there is provided a permanent magnet 201 having an air gap 202 between the pole faces thereof. A coil 203 is coupled to the magnet so that any change in flux in the magnet will generate a signal in the coil 203. The coil is connected to an amplifier 204 and thence to an integrator 205. By this means there may be produced at the output terminals 206 a voltage waveform of the type illustrated in FIGURE 4. The actual configuration of the waveform will depend upon the attitude of the document 10 as it travels through the document way. Variation in spacing between the magnetic deposit 200 along the bottom edge of the document 10 and magnet 201 will produce at terminals 206 a varying voltage of the type above described on which the signaling operation may be based. However, it will be clearly apparent that the method of the invention can be carried out through use of either the light sensitive system of FIGURES 1 and 2 or the magnetic system of FIGURE 5.

The output terminals 206 are to be coupled through suitable impedance matching means to a circuit of the type illustrated in FIGURE 2. In either the magnetic system or the light sensitive system a function is generated which will vary monotonically with time during the interval that the document passes the sensing station in dependence upon variations in the spacing between the edge of the document and the sensing station. In each of the two signal channels there is established a condition, such as a charge on a storage condenser, proportional to the magnitude of the function at a reference instant during the transit interval. The reference instant, in accordance with the foregoing description, coincides with the onset of the pulse of FIGURE 4 but suitable gating may be employed to select a reference instant later than the onset. The condition thus established is compared with the magnitude of the function at a later time during the transit interval. An output signal is generated if the function changes in magnitude during the transit interval beyond preset proportional limits relative to the established circuit condition.

In both the light sensitive system and the magnetic system a sensing means is provided for generating a function which varies in amplitude in accordance with variations in spacing between an edge of a document relative to a first point along the document way. A circuit is connected to the sensing means as above described for generating a circuit condition, for example, by establishing and maintaining a charge on a capacitor. If during a preset interval during travel of the document past the sensing point the function produced in response thereto varies to or beyond a predetermined threshold which differs from the initial magnitude of the function by a predetermined amount, then there is provided a means responsive to such occurrence for generating an output function signaling the attainment of the threshold condition.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for determining the attitude of a document traveling in a document way which comprises:
(a) sensing means for generating a function which varies in amplitude in accordance with the variation in spacing between an edge of a document relative to a fixed point along said way,
(b) a comparison circuit connected to said sensing means for comparing an early and a late value of said function to generate a circuit condition proportional to variation in said functions,
(c) output means for generating an output function in response to said circuit condition, and
(d) control means responsive to said comparison circuit for inhibiting said output means except when in a preset interval during travel of said document past said point, said function varies in amplitude more than a predetermined amount.

2. A system for determining the attitude of a document traveling in a document way which comprises:
(a) sensing means for generating a pulse which varies in amplitude in accordance with the variation of position of a document relative to said way,
(b) a circuit connected to said sensing means for comparing a first value of the amplitude of said pulse and a second value of the amplitude of said pulse to generate a circuit condition proportional to variations in said pulse,
(c) output means for generating an output function in response to said circuit condition, and
(d) means responsive to said circuit; for inhibiting said output means except when, in a preset interval during travel of said document, said pulse varies in amplitude more than a predetermined amount.

3. A system for determining the attitude of a document traveling in a document way which comprises:
(a) a light source on one side of said way,
(b) a light detector on the other side of said way for generating a function which varies in accordance with variations in light transmitted past said document in the interval it passes through said way between said source and detector,
(c) indicating means,
(d) a circuit connected between said detector and said indicating means for actuating said indicating means, and
(e) control means responsive to said detector for inhibiting said indicating means except when said function varies in amplitude more than a predetermined amount during said interval.

4. A system for determining the attitude of a document traveling in a document way which comprises:
(a) sensing means for generating a pulse which varies in accordance with variations in spacing between an edge of a document and a fixed point along said way,
(b) a first circuit connected to said sensing means including a first condenser for receiving a charge proportional to the magnitude of said pulse at a first time corresponding with the registration of the leading edge of said document and said fixed point and further including means responsive to said sensing means for producing a predetermined fraction of the voltage across said first condenser and comparing said fractions with the magnitude of said pulse at a second time,
(c) a second circuit connected to said sensing means including a pulse inverter and a second condenser for receiving a charge proportional to the magnitude of the inversion of said pulse at said first time and further including means responsive to said inverter for producing a predetermined fraction of the voltage across said second condenser and comparing said fraction with the magnitude of the inversion of said pulse at said second time, (d) a separate discharge circuit for each said condenser,
(e) means for generating a control pulse having a leading edge corresponding with registration of the leading edge of said document with said fixed point and applied to the discharge circuits for rendering them non-conductive,
(f) an and-gate in each said first and second circuit having one input connected to the comparison means therein and the other input actuated in response to the trailing edge of said control pulse,
(g) indicating means, and
(h) a control circuit in each said first and second circuit connected between said indicating means and the respective and-gates for energizing said indicating means.

5. The system recited in claim 4 wherein each said comparing means includes a voltage divider means connected to the associated condenser for producing said predetermined fraction of voltage thereacross.

6. A system for determining the attitude of a document traveling in a document way which comprises:
(a) sensing means for generating a pulse which varies in accordance with variations in spacing between an edge of a document relative to a fixed point along said way,
(b) a circuit connected to said sensing means including a condenser for receiving and holding a charge proportional to the magnitude of said pulse at a first time thereon,
(c) means for producing a voltage proportional to a predetermined fraction of the charge held on said condenser,
(d) comparison means connected to said condenser and to said sensing means for comparing said voltage with the magnitude of said pulse at a second time thereon,
(e) an indicator, and
(f) switch means connecting said circuit to said indicator responsive to a change in amplitude of said pulse in the interval between said first time and said second time with reference to said voltage for reference to said voltage for energizing said indicator.

7. A system for determining the attitude of a document traveling in a document way which comprises:
(a) sensing means for generating a pulse which varies in accordance with variations in spacing between an edge of a document relative to a fixed point along said way,
(b) a first circuit connecting to said sensing means including a condenser for receiving and holding a charge proportional to the magnitude of said pulse at a first time thereon,
(c) means for producing a first voltage proportional to a predetermined fraction of the charge held on said condenser,
(d) comparison means connected to said condenser and to said sensing means for comparing said first voltage with the magnitude of said pulse at a second time thereon,
(e) a second circuit connected to said sensing means including a pulse inverter and a second condenser for receiving and holding a charge proportional to the magnitude of the inversion of said pulse at a first time thereon,
(f) means for producing a second voltage proportional to a predetermined fraction of the charge held on said second condenser,
(g) a second comparison means connected to said second condenser and to said sensing means for comparing said second voltage with the magnitude of the inversion of said pulse at a second time thereon,
(h) indicating means, and (i) switch means in each of said first circuit and said second circuit responsive to a decrease and increase respectively in amplitude of said pulse in the interval between the first time and the second time beyond the first and second voltages for energizing said indicating means.

8. A system for determining the attitude of a document traveling in a document way which comprises:

(a) sensing means for generating a broad pulse which varies in amplitude in accordance with any variation in spacing between an edge of a document relative to a fixed point along said way, (b) a circuit connected to said sensing means including a condenser for receiving and holding a charge proportional to the magnitude of said pulse at a first time corresponding with passage of the leading edge of said document, (c) means for producing a voltage proportional to a predetermined fraction of the charge held on said condenser, (d) means in said circuit including a generator for producing a delayed narrow pulse and comparison means for comparing in response to said delayed pulse said voltage with the magnitude of said pulse at a second time corresponding with passage of a trailing portion of said document, (e) indicating means, and (f) switch means interconnecting said comparison means and said indicating means operable in response to a change in the amplitude of said broad pulse at the instant of said delayed pulse beyond said voltage for energizing said indicating means.

9. A system for determining the attitude of a document traveling in a document way comprises:

(a) sensing means for generating a broad pulse which varies in amplitude in accordance with any variations in spacing between an edge of a document relative to a fixed point along said way, (b) a first circuit connected to said sensing means including a first condenser, (c) a second circuit connected to said sensing means cluding a pulse inverter and a second condenser, (d) a separate charge control means for said first condenser and for said second condenser for maintaining charges thereon proportional respectively to the amplitude of said broad pulse at a time associated with registration between a leading edge portion of said document and said fixed point, (e) means for producing voltages respectively representative of predetermined fractions of the voltages across the condensers, (f) a first comparison means connected to said sensing means and said first condenser for comparing the predetermined fraction of the voltage across said first condenser with the magnitude of said pulse at a second time associated with registration of a trailing portion of said document and said fixed point, (g) a second comparison means connected to said second condenser and said sensing means for comparing the predetermined fraction of the voltage across said second condenser with the magnitude of the inversion of said pulse at said second time, (h) indicating means, and (i) separate switch means in each of said first circuits and said second circuit responsive to a decrease and an increase respectively in amplitude of said pulse in the interval between the first time and said second time with reference to the predetermined fractions of the voltages on the condensers for energizing said indicating means.

10. The combination set forth in claim 9 in which means are provided for actuating said separate charge control means after said second time to discharge the condensers.

11. A device for determining the attitude of a document in a document way during a transit interval comprising:

(a) means for generating a function which varies with time during said interval in accordance with variation of position of a document relative to said way, (b) means for establishing a condition proportional to the magnitude of said function at a reference instant during said interval, (c) means for comparing said function and said condition during said interval, and (d) means for producing an output signal only when said function changes in magnitude beyond preset proportional limits relative to said condition.

References Cited by the Examiner

UNITED STATES PATENTS

| | | | |
|---|---|---|---|
| 2,830,191 | 4/1958 | McCollom et al. | 250—214 |
| 2,894,248 | 7/1959 | Relis et al. | 235—61.115 |
| 3,041,462 | 6/1962 | Ogle | 250—219.4 |
| 3,108,727 | 10/1963 | Farber | 250—219.1 |

ROBERT C. BAILEY, *Primary Examiner.*

MALCOLM A. MORRISON, *Examiner.*

P. J. HENON, *Assistant Examiner.*